United States Patent Office 3,184,414
Patented May 18, 1965

3,184,414
CATALYST CARRIER AND METHOD OF
PREPARATION THEREOF
Gerhard Koch and Karl-Hermann Koepernik, Hannover,
Germany, assignors to Kali-Chemie Aktiengesellschaft,
Hannover, Germany, a corporation of Germany
No Drawing. Filed Aug. 23, 1962, Ser. No. 218,847
Claims priority, application Germany, Aug. 26, 1961,
K 44,588
8 Claims. (Cl. 252—455)

The present invention relates to a new and improved process of producing a catalyst carrier and more particularly to a process of producing a catalyst carrier of high mechanical strength and high specific surface, and to such catalyst carriers.

It has been suggested repeatedly to use clay either as such or in mixture with alumina or hydrated alumina for producing catalyst carriers. Untreated or acid treated kaolins or bentonites are usually used for this purpose. However, such carriers do not meet in all cases the requirements with respect to their specific surface, and porosity.

It is one object of the present invention to provide a simple and effective process of producing catalyst carriers which are composed of bentonite, treated in a special manner, and hydrated alumina and which possess especially advantageous properties.

Another object of the present invention is to provide such catalyst carriers with especially advantageous properties such as high mechanical strength, high resistance to abrasion, large specific surface, high porosity.

In principle, the process according to the present invention consists in using a bentonite having sodium and/or lithium ions, in place of kaolin, untreated bentonite in its Ca-form, or bentonite which has been converted by acid treatment into the H-form. Such sodium and/or lithium ion containing bentonite is employed according to the present invention in mixture with hydrated alumina for making a catalyst carrier of advantageous properties.

To produce a catalyst carrier according to the present invention, bentonite containing sodium and/or lithium ions is mixed with hydrated alumina, for instance, with hydrargillite, bayerite, boehmite, nordstrandite, amorphous aluminum hydroxide, and the like, or mixtures thereof. The mixture of bentonite and hydrated alumina is pasted with water, molded to shaped and molded bodies, dried, and calcined at a temperature between about 900° C. and about 1300° C., preferably at a temperature between about 950° C. and about 1050° C. for ½ hour to 4 hours. A carrier produced in this manner is distinguished from heretofore known and used carriers by its excellent mechanical strength, its high resistance to abrasion, its high specific surface area, and its high porosity.

These advantageous properties are the result of the use of a bentonite which contains sodium and/or lithium ions as exchangeable cations. Such sodium or lithium bentonites are highly swellable by the addition of water. Even a low moisture content imparts to such a bentonite-hydrated alumina mixture the plastic properties required for further processing and results in an excellent coherence of the molded and shaped mixture.

It is known that the strength properties of a calcined catalyst carrier are dependent to a large extent upon the amount of water used for pasting the mixture and upon the amount of lubricating agent and of binding agent employed. In order to achieve high mechanical strength properties without impairing the surface area, it is necessary to use as little water and additives as possible. On the other hand, too low a moisture content renders the mixture difficultly moldable. If only small amounts of water are to be used, it is necessary to add lubricating agents. Addition of large amounts of water and/or lubricating agent requires a higher calcination temperature than when using less water and/or no lubricating agent. High calcination temperatures, however, result in a reduction in the specific surface area of the carrier and thus impair the catalytic activity of the final catalyst.

By using sodium or, respectively, lithium bentonite according to the present invention, these difficulties as they were encountered heretofore are eliminated because only a small amount of water is required for further working up and molding the carrier mixture due to the excellent swellability of such a bentonite and the remarkable plasticity of the mixture. As a result thereof the calcination temperature can be kept as low as possible, namely between about 900° C. and about 1300° C. and preferably between about 950° C. and about 1050° C. In spite of such a low calcination temperature, the catalyst carrier possesses the required mechanical strength. The calcination temperature is dependent upon the desired properties of the catalyst carrier. If a high mechanical strength is desired, the calcination temperature should be higher than when producing a carrier with a large surface area. In general, calcination for ½ hour to 4 hours is sufficient to produce the desired result.

According to another embodiment of the present invention the surface area and the strength properties of the carrier can be varied by varying the proportion of bentonite to hydrated alumina or aluminum hydroxide. Bentonite imparts to the carrier high mechanical strength properties even at calcination temperatures of 900° C. to 1000° C. while the porosity and the surface area of the carrier are affected by the type of hydrated alumina used. The process according to the present invention permits the preparation of carriers of high mechanical strength properties with a surface area up to 120 sq. m./g.

It has been found that an amount of 10% of sodium bentonite is sufficient to yield a mixture, for instance, with a coarsely pulverized hydrargillite of low moisture content and without the addition of lubricating and binding agent that can be further processed in a satisfactory manner and yields a carrier of excellent strength properties. The proportion of bentonite to aluminum hydroxide may vary between 1:9 and 1:0.25 depending upon the purpose for which the catalyst carrier is to be used. A proportion 1:9 to 1:2.3 is preferred because such a proportion imparts to the carrier exceptionally high mechanical strength properties.

In order to determine the mechanical strength of the resulting carrier, its bursting strength is determined, i.e. the load in kg. which is required to break a 6 mm. long cylinder on radial exposure to a load.

The surface area is determined by measuring the nitrogen adsorbed by the carrier according to the B.E.T. method.

Carriers produced according to the present invention may be provided in a manner known per se with catalytically active agents. The final carrier catalysts are produced usually by impregnating or by spraying the calcined carrier with the respective metal salt solution. The catalytically active metal or metal oxide is then precipitated from the adsorbed salt, for instance, by reduction, heat decomposition, precipitation, and like processes.

Catalytically active metals or, respectively, metal oxides as they can be deposited on carriers according to the present invention are, for instance, the noble metals, such as platinum, palladium, metals or metal oxides of the group of transition elements and especially the metals iron, cobalt, and nickel. Combinations of such metals or, respectively, metal oxides, may also be used. If desired, alkali metals or alkaline earth metals may be added thereto, for instance, as stabilizers or promoters.

The bentonite is charged with soduim and/or lithium ions, for instance, by repeatedly treating the same with solutions of sodium and/or lithium compounds, preferably of sodium and/or lithium salts such as sodium carbonate, sodium chloride, or lithium chloride. Ordinarily N/10 to N/1 solutions are used for this purpose and the treatment is effected at room temperature.

The following examples serve to illustrate the present invention without, however, limiting thereto.

*Example 1*

To prepare a carrier according to the present invention, 100 g. of pulverized air-dry sodium bentonite are intimately mixed with 900 g. of pulverized $\alpha$-alumina trihydrate. The mixture is then kneaded with 200 g. of water. The resulting paste is extruded through a die of 4 mm. diameter and the resulting strand is cut into pieces of 4 mm. to 8 mm. length. The resulting moist carrier pieces are dried at a temperature between 40° C. and 100° C. for several hours and are then calcined in an oven-type furnace. The temperature is gradually and slowly increased from room temperature to a temperature of 1000° C., which temperature is kept for one hour in order to achieve the desired strength properties. The calcined pieces are cooled first in the closed and then in the opened furnace. An air current is passed through the oven during calcination.

The bursting strength of the carrier obtained in this manner is 15.8 kg. Its surface area was determined to 44 sq. m./g.

*Example 2*

40 g. of pulverized sodium bentonite are thoroughly kneaded with 250 g. of a mixture of various crystalline alumina monohydrates and alumina trihydrates and with amorphous aluminum hydroxide which mixture contains about 53% of free water. The resulting plastic mixture is extruded through a die and the resulting strands are cut to pieces of the desired length, dried, and calcined at 1050° C. for one and a half hour.

The bursting strength of the resulting carrier exceeds 20 kg. Its surface area amounts to about 120 sq. m./g.

*Example 3*

A mixture of 20 kg. of sodium bentonite and 80 kg. of coarsely pulverized $\alpha$-alumina trihydrate is mixed with 25 kg. of water and is then extruded to cylindrical carrier bodies. Said bodies are dried for a short period of time and are then calcined in a rotary kiln up to a temperature of 1000° C. while passing therethrough within about 40 minutes.

*Example 4*

A bentonite containing lithium ions is used for producing the carrier according to the present invention whereby the procedure is the same as that described in Example 1. The resulting carrier has a bursting strength of 17 kg. and a surface area of about 50 sq. m./g.

Of course, many changes and variations in the bentonite containing sodium and/or lithium ions used, in the hydrated alumina employed, in the amount of water added, in the molding and shaping process, in the drying and calcination temperature and duration, and the like may be made by those skilled in the art in accordance with the principles set forth herein and in the claims annexed hereto.

As stated hereinabove, the bentonite is charged with sodium and/or lithium ions by suspending comminuted bentonite after removing larger lumps, for instance, in an N sodium chloride solution while stirring. The resulting mixture is allowed to stand for about 24 hours. The supernatant liquid is removed by decanting and the bentonite is again suspended in N sodium chloride solution while stirring. This treatment may be repeated several times depending upon the amount of calcium ions to be replaced by sodium ions. Thereafter, the treated bentonite is washed with water.

In place of sodium chloride solution, there may be used lithium chloride solution or a mixture of both solutions.

It is not necessary to replace all the calcium ions of bentonite by sodium and/or lithium ions. The ion exchange treatment is discontinued as soon as the treated bentonite forms a plastic and moldable composition on admixture to hydrated alumina, i.e. the treated bentonite should have sufficient plasticity to be further processed.

The addition of bentonite renders the carrier mixture plastic and moldable. The alumina hydrate as such is an excellent catalyst support with respect to activity and surface area, but it is very difficult to mold it and to produce shaped catalyst carriers of mechanical strength of this material. The amount of bentonite used for the catalyst carrier according to the invention depends on the required plasticity of the carrier mass for molding. If too much bentonite is added the resulting carrier will sinter when used at high temperatures i.e. at 1000° C. and higher, and accordingly decrease in activity.

We claim:

1. In a process of producing molded catalyst carrier bodies of high mechanical strength and high specific surface, the steps which comprise mixing a bentonite, the alkaline earth metal ions thereof being at least partly replaced by alkali metal ions selected from the group consisting of sodium ions and lithium ions, with hydrated alumina and an amount of water sufficient to permit molding of the resulting mixture, the proportion of bentonite to hydrated alumina being between about 1:0.25 and about 1:9, molding said mixture to molded bodies, drying said carrier bodies, and calcining the dried carrier bodies at a temperature between about 900° C. and about 1300° C.

2. The process according to claim 1, wherein the calcination temperature is between about 950° C. and about 1050° C.

3. The process according to claim 1, wherein molding is effected by extrusion molding.

4. The process according to claim 1, wherein the proportion between bentonite and hydrated alumina is between about 1:2.3 and about 1:9.

5. The process according to claim 1, wherein the hydrated alumina is alumina selected from the group consisting of hydrargillite, bayerite, boehmite, nordstrandite, amorphous aluminum hydroxide, and mixtures thereof.

6. The process according to claim 5, wherein the proportion of bentonite to hydrated alumina is between about 1:2.3 and about 1:9.

7. A catalyst carrier of high mechanical strength and high specific surface area comprising a calcined mixture of bentonite, the alkaline earth metal ions thereof being at least partly replaced by ions selected from the groups consisting of sodium ions and lithium ions, with hydrated alumina, the proportion of bentonite to hydrated alumina being between about 1:0.25 and about 1:9, said carrier being calcined at a temperature between about 900° C. and about 1300° C.

8. A catalyst carrier of high mechanical strength and high specific surface area comprising a calcined mixture of bentonite, the alkaline earth metal ions thereof being at least partly replaced by ions selected from the groups consisting of sodium ions and lithium ions, with hydrated alumina, the proportion of bentonite to hydrated alumina being between about 1:2.3 and about 1:9, said carrier being calcined at a temperature between about 900° C. and about 1300° C.

References Cited by the Examiner

UNITED STATES PATENTS

| | | | |
|---|---|---|---|
| 2,444,965 | 7/48 | Thomas et al. | 252—455 |
| 2,455,713 | 12/48 | Voorhies | 252—455 XR |
| 2,638,454 | 5/53 | Rowan | 252—455 |

MAURICE A. BRINDISI, *Primary Examiner.*